United States Patent
Umezawa et al.

(10) Patent No.: US 9,392,813 B2
(45) Date of Patent: Jul. 19, 2016

(54) BEER-TASTE BEVERAGES WITH FOAM STABILIZED

(75) Inventors: Yusuke Umezawa, Fuchu (JP); Mai Kitsukawa, Fuchu (JP)

(73) Assignee: SUNTORY HOLDINGS LIMITED, Osaka-shi, Osaka (JP)

( * ) Notice: Subject to any disclaimer, the term of this patent is extended or adjusted under 35 U.S.C. 154(b) by 0 days.

(21) Appl. No.: 13/696,717

(22) PCT Filed: May 19, 2011

(86) PCT No.: PCT/JP2011/061481
§ 371 (c)(1),
(2), (4) Date: Nov. 9, 2012

(87) PCT Pub. No.: WO2011/145671
PCT Pub. Date: Nov. 24, 2011

(65) Prior Publication Data
US 2013/0052320 A1 Feb. 28, 2013

(30) Foreign Application Priority Data

May 19, 2010 (JP) .................................. 2010-114999
May 28, 2010 (JP) .................................. 2010-122335
Jul. 30, 2010 (JP) .................................. 2010-172720

(51) Int. Cl.
*A23L 2/00* (2006.01)
*A23L 2/38* (2006.01)
*A23L 2/52* (2006.01)

(52) U.S. Cl.
CPC .... *A23L 2/38* (2013.01); *A23L 2/52* (2013.01)

(58) Field of Classification Search
CPC ............. A23L 2/00; A23L 2/38; A23L 2/382; A23L 2/52
USPC ............................... 426/329, 330.3, 442, 590
See application file for complete search history.

(56) References Cited

U.S. PATENT DOCUMENTS

| 1,673,273 | A | * | 6/1928 | Wallerstein ...................... 426/29 |
| 4,765,993 | A | * | 8/1988 | Owades ........................... 426/29 |
| 4,957,766 | A | * | 9/1990 | Maria de Kort et al. ....... 426/592 |
| 4,957,767 | A |   | 9/1990 | Maria de Kort et al. |
| 2006/0016513 | A1 | | 1/2006 | Oono et al. |
| 2006/0051483 | A1 | | 3/2006 | Watanabe et al. |
| 2007/0026105 | A1 | | 2/2007 | Seo et al. |
| 2008/0085355 | A1 | | 4/2008 | Oono et al. |

FOREIGN PATENT DOCUMENTS

| CN | 1675350 A | 9/2005 |
| DE | 4138808 C1 | 4/1993 |
| DE | 69828405 T2 | 6/2005 |
| DE | 102004008765 A1 * | 9/2005 |
| JP | 2001-95541 | 4/2001 |
| JP | 2001095541 A * | 4/2001 |
| WO | WO-9849278 A1 | 11/1998 |
| WO | 2011/145671 | 11/2011 |

OTHER PUBLICATIONS

Kunze Wolfgang, "Technology brewing & malting", p. 40, 55-56, 180, 186-187, 734, 740-742, 765, (2004) (and bibliographic data of its original text).
p. 504, 536 of Russian translation of F. Hlavacek et al., "Brewing beer", Pishchevaya Promishlennost, 1972.
N.A.Emelyanova et al., "Chemical composition of malt extracts", 1988, http://dpace.nuft.edu.ua/jspui/handle/123456789/9418 (and bibliographic data by eNUFTIR).
International Preliminary Report on Patentability issued Dec. 10, 2012 in International Application No. PCT/JP2011/061481.
International Search Report mailed Aug. 9, 2011 in PCT/JP2011/061475 filed May 29, 2011.
Slack, et al., "The Fractionation of Polypeptides From Barley and Beer by Hydrophobic Interaction Chromatography: The Influence of Their Hydrophobicity of Foam Stability", J. Inst. Brew., Nov.-Dec. 1983, vol. 89, pp. 397-401.
Anonymous: "GNPD—Super Clear Beer-Flavoured Drink", Product Details, Sapporo Breweries, Japan, Oct. 1, 2009, pp. 1-2, retrieved from the: internet: URL: http://www.gnpd.com/sinatra/recordpage/1198830/from search/1xYVnT1Zal/.
EP11783605.6—Extended European Search Report mailed Aug. 31, 2015.

* cited by examiner

*Primary Examiner* — Jyoti Chawla
(74) *Attorney, Agent, or Firm* — Drinker Biddle & Reath LLP

(57) ABSTRACT

The present invention provides a new means for improving the foam quality, especially foam stability, of beer-taste beverages. Specifically, the amount of mugi-derived extract components in beer-taste beverages is adjusted to lie from 0.1 to 2 wt % inclusive.

7 Claims, No Drawings

BEER-TASTE BEVERAGES WITH FOAM STABILIZED

CROSS REFERENCE TO RELATED APPLICATIONS

This application is the National Stage of International Application No. PCT/JP2011/061481, filed May 19, 2011, and claims benefit of Japanese Application Nos. 2010-114999, 2010-122335, and 2010-172720, filed respectively on May 19, 2010, May 28, 2010, and Jul. 30, 2010, all of which are herein incorporated by reference in their entirety.

TECHNICAL FIELD

The present invention relates to a method of stabilizing the foam in beer-taste beverages, the beer-taste beverages with foam stabilized, and a process for producing such beverages.

BACKGROUND ART

As more consumers are becoming health-conscious, the demand for low-calorie or low-saccharide articles has also increased in the market of beverages of taste such as beer, happoshu, and beer-taste beverages. Specific examples the demand for which has been growing include light beer and various beer-taste beverages such as low-calorie type and low-saccharide type. In addition, stricter penalties on drunk driving as introduced by the recent revision of the Road Traffic Act has boosted the demand for low-alcohol or non-alcoholic (0.00% alcohol) beer-taste beverages. However, it has been difficult to assure adequate foam quality in the currently available beer-taste beverages targeted at health-conscious consumers.

Patent Document 1 discloses the use of yeast cell wall derived soluble fractions to improve the foam quality of foaming beverages such as beer.

Patent Document 2 discloses a method of enhancing the foam properties of a beverage using a foam enhancing formulation comprising a Labiate herb preparation comprising at least one naturally occurring species derived from Labiate herbs as selected from among carnosic acid and carnosol.

CITATION LIST

Patent Literature

Patent Document 1: JP 2007-174967A
Patent Document 2: JP 4439520B

SUMMARY OF INVENTION

Technical Problem

The art disclosed in Patent Documents 1 and 2 requires the use of special substances, i.e., the yeast cell wall derived soluble fraction, carnosic acid, and carnosol. Another problem is that these substances might have adverse effects on the scent/taste and other properties of the beverage containing them.

Accordingly, it is strongly desired to improve the quality of the foam in beer-taste beverages.

Solution to Problem

The quality of foam is evaluated from various viewpoints such as foam stability, the degree of foaming, and the creami-ness of foam. If the foam is stable, contact between the beer-taste beverage and air can be effectively prevented and the appearance of the beverage poured into a container can be kept for an extended period. Getting the idea that foam stability is particularly important for the purpose of assuring the quality of the foam in beer-taste beverages of low-alcohol or non-alcoholic type, the present inventors made intensive studies. As a result, the present inventors found that by adjusting the total amount of malt-derived extract components in a beer-taste beverage to lie from 0.1 to 2 wt % inclusive, not only the richness of the taste of the beverage but also the quality of foam, especially its stability, could be assured. The present inventors further discovered that this effect could be achieved not only by adjusting the amount of the malt-derived extract components but also by adjusting the amount of extract components derived from various kinds of mugi including malt. Thus, the present inventors found that the same effect could also be attained by adjusting the total amount of mugi-derived extract components in a beer-taste beverage to lie from 0.1 to 2 wt % inclusive. This technology can advantageously be applied to low-alcohol or non-alcoholic beverages.

Briefly, the present invention concerns the following.

1. A beer-taste beverage in which the total amount of a mugi-derived extract component(s) is from 0.1 to 2 wt % inclusive, and the alcohol content is no more than 1.0%.
2. The beer-taste beverage as recited in 1, wherein the total amount of the mugi-derived extract component(s) is from 0.2 to 2 wt % inclusive.
3. The beer-taste beverage as recited in 1 or 2, wherein the total amount of the mugi-derived extract component(s) is from 0.25 to 1.3 wt % inclusive.
4. The beer-taste beverage as recited in 1, wherein the total amount of a malt-derived extract component(s) is from 0.1 to 2 wt % inclusive.
5. The beer-taste beverage as recited in 1, 2 or 4, wherein the total amount of the malt-derived extract component(s) is from 0.2 to 2 wt % inclusive.
6. The beer-taste beverage as recited in any one of 1 to 5, wherein the total amount of the malt-derived extract component(s) is from 0.25 to 1.3 wt % inclusive.
7. The beer-taste beverage as recited in any one of 1 to 6, wherein the calorie content is from 1 to 8 kcal/100 mL inclusive.
8. The beer-taste beverage as recited in any one of 1 to 7, wherein the amount of saccharides is from 0.2 to 2.0 g/100 mL inclusive.
9. The beer-taste beverage as recited in any one of 1 to 8, wherein the total amount of all extract components including ones derived from ingredients other than mugi is from 0.2 to 2.1 wt % inclusive.
10. The beer-taste beverage as recited in any one of 1 to 9, which is obtained using hops as an ingredient.
11. The beer-taste beverage as recited in any one of 1 to 10, which is obtained using dark colored malt in an amount from 20 to 80 wt % (inclusive) of the total amount of malt as an ingredient.
12. The beer-taste beverage as recited in any one of 1 to 11, which is free of alcohol.
13. A method of stabilizing the foam of a beer-taste beverage having an alcohol content of no more than 1.0%, comprising adjusting the total amount of a mugi-derived extract component(s) in the beverage to lie from 0.1 to 2 wt % inclusive.
14. The method as recited in 13, wherein the stabilization of foam is an improving in the cling.

15. A process for producing a beer-taste beverage having an alcohol content of no more than 1.0%, comprising adjusting the total amount of a mugi-derived extract component(s) in the beverage to lie from 0.1 to 2 wt % inclusive.
16. A beer-taste beverage in which the total amount of a malt-derived extract component(s) is from 0.2 to 2 wt % inclusive, and the alcohol content is no more than 1.0%.

Advantageous Effects of invention

In accordance with the present invention, the foam that is formed on the liquid surface of beer-taste beverages of low-alcohol or non-alcoholic type can be assured to have adequate quality, especially, in terms of stability. What is more, the special substances mentioned in Patent Documents 1 and 2 (the yeast cell wall derived soluble fraction, carnosic acid, and carnosol) need not be used, so not only convenience is provided but, at the same time, the potential adverse effects of those components on scent and taste are reduced. In addition, there is no need to add bitterness imparting agents which are believed to contribute to better foam stability.

Although not being bound by theory, it is speculated that the above-described effects are due to the fact that as the amounts of extract components derived from mugi such as malt decrease, so do the amounts of substances that are considered to be contained in mugi such as malt and which interfere with foam stability. It should be noted that this speculation is by no means intended to limit the present invention.

DESCRIPTION OF EMBODIMENTS (Mugi-derived Extract Components)

In the present invention, it is important to reduce the total amount of extract components derived from mugi such as malt in beer-taste beverages. However, if the amount of the mugi-derived extract components is too small, the beer-like taste required of beer-taste beverages can be extremely weak. In the present invention, the total amount of the mugi-derived extract component(s) in a beer-taste beverage is adjusted to lie from 0.1 to 2 wt % inclusive, preferably from 0.2 to 2 wt % inclusive, more preferably from 0.2 to 1.3 wt % inclusive, even more preferably from 0.25 to 1.3 wt % inclusive, still more preferably from 0.3 to 1.3 wt % inclusive, and yet more preferably from 0.35 to 1 wt % inclusive.

Among various types of mugi available as ingredients, malt is used fairly often in the manufacture of beer-taste beverages. Hence, adjusting the amount of the malt-derived extract components in beer-taste beverages has a substantial effect on the stability of foam. Therefore, the present invention also encompasses adjusting the total amount of the malt-derived extract components in beer-taste beverages. In this case, the total amount of the malt-derived extract component(s) is adjusted to lie from 0.1 to 2 wt % inclusive, preferably from 0.2 to 2 wt % inclusive, more preferably from 0.2 to 1.3 wt % inclusive, even more preferably from 0.25 to 1.3 wt % inclusive, still more preferably from 0.3 to 1.3 wt % inclusive, and yet more preferably from 0.35 to 1 wt % inclusive.

In the present invention, the total amount of all extract components including those which are derived from ingredients other than mugi is adjusted to lie within particular ranges in consideration of various factors such as the need to fully develop the scent and taste derived from mugi. For example, the total amount of such extract components in a beverage is from 0.2 to 2.1 wt % inclusive, preferably from 0.3 to 2.1 wt % inclusive, more preferably from 0.3 to 1.4 wt % inclusive, even more preferably from 0.35 to 1.4 wt % inclusive, still more preferably from 0.4 to 1.4 wt % inclusive, and yet more preferably from 0.45 to 1.1 wt % inclusive.

In the case of beverages having an alcohol content of at least 0.005%, the "amount of extract components" as used herein refers to the value of grams of extract components as specified in the Japanese Liquor Tax Act, namely, the non-volatile matter contained in a unit volume of 100 cubic centimeters at a temperature of 15 degrees; in the case of beverages the alcohol content of which is less than 0.005%, the term refers to the extract level (wt %) in degassed samples as measured in accordance with "Beer Analysis Methods, 7.2 Extracts" specified by Brewery Convention of Japan (BCOJ) of Brewers Association of Japan. Of all the extract components contained, those which are derived from mugi such as malt may be determined for their amount by subtracting the amounts, as separately determined, of additives and extract components derived from other ingredients, from the amounts of all extract components as determined by actual measurement.

The methods of adjusting the amount of mugi-derived extract components are not particularly limited and examples that may be contemplated include adjusting the amount of mugi to be used as an ingredient or diluting the beverage.

(Mugi)

The term "mugi" as used herein means mugi (usually its berry) that is employed in producing ordinary beers and happoshu as well as their processed products, and malt is included within the definition of mugi.

Mugi other than malt that are employed as ingredients in the present invention may be exemplified by such mugi as yet-to-be-germinated barley, wheat, rye, karasumugi (white oats), oats, hatomugi (Job's-tears), and embaku (oats). Among others, yet-to-be-germinated barley can be used with advantage. These ingredients can be used either independently or in combination. They can even be used in combination with malt.

Yet-to-be-germinated mugi can also be used as decomposition products of mugi which are obtained by preliminarily breaking down mugi with externally-added or malt-derived enzymes. The term "decomposition products of mugi" as used herein refers to a product obtained by liquefying and saccharifying mugi enzymatically and then concentrating the resulting saccharified liquid. To effect enzymatic liquefaction, α-amylase is mainly used. For efficient liquefaction, α-amylase is preferably used in combination with (β-glucanase. To break down the proteins in mugi, proteases may also be added. For saccharification, α-amylase is used, optionally in combination with β-amylase, glucoamylase, pullulanase, etc. After the enzymatic reaction with α-amylase, heating and concentration are carried out to yield the decomposition product of mugi to be used in the present invention. Among the various decomposition products of mugi, decomposed barley can be used with particular advantage. Barley to be used as the starting material to make decomposed barley is not particularly limited if it is yet to be germinated and while any edible variety of barley may be used, the varieties used in malt production are preferred.

As used herein, the term "malt" refers to a product obtained by germinating the seeds of mugi such as barley, wheat, rye, karasumugi (white oats), oats, hatomugi (Job's-tears), and embaku (oats), drying the sprouts, and removing their roots. The geographic regions of malt production are not particularly limited, either. It is particularly preferred to use barley malt. In the present invention, not only regular malt but also dark colored malt may be used.

As used herein, the term "dark colored malt" refers to such malts that the chromaticity as specified by EBC (the European Brewery Convention) is at least 10, preferably at least 50. In the present invention, malt is used in smaller amounts than in ordinary beers and the like, so only inadequate beer-like colors may sometimes develop. To cope with this problem, dark colored malt may be used as one ingredient to adjust the color of the beverage. Preferably, the dark colored malt is used in an amount ranging from 20 to 80 wt % inclusive, preferably from 40 to 60 wt % inclusive, of the total amount of the malt used as an ingredient. The upper limit of the EBC chromaticity of the dark colored malt is not particularly limited but if malt of excessively high chromaticity is used, the beverage may be adversely affected as by a trace of burned smell and, hence, it is recommended to use dark colored malt having an EBC chromaticity of preferably no higher than 2000, more preferably no higher than 1000, even more preferably no higher than 500, and most preferably no higher than 200. Therefore, the range of the EBC chromaticity of the dark colored malt to be used is not particularly limited but it is preferably from 10 to 2000 inclusive, more preferably from 50 to 1000 inclusive, even more preferably from 50 to 500 inclusive, and most preferably from 50 to 200 inclusive. Methods of measuring the EBC chromaticity are widely known to skilled artisans, who can readily perform a measurement by referring, for example, to "Revised BCOJ Beer Analysis Methods, 4.3.8" compiled by Brewery Convention of Japan (Committee on Analysis) of Brewers Association of Japan, Brewing Society of Japan.

(Beer-taste Beverages)

The term "beer-taste beverages" as used herein refers to carbonated drinks having a beer-like flavor. Thus, unless otherwise noted, beer-taste beverages as referred to herein embrace all types of carbonated drinks with a beer flavor whether or not they are produced via a yeast-based fermentation step. The present invention is directed to particular types, low-alcohol or non-alcoholic type, of these beverages and their alcohol content is not greater than 1.0%, preferably not greater than 0.5%, more preferably not greater than 0.005%, and even more preferably they are free of alcohol. In the case where the beverage of the present invention is alcohol-free (i.e., non-alcoholic beverage), beverages which contain alcohol in a trace amount that is too small to be detected are within the scope of the present invention. Included within the scope of the non-alcoholic beverage of the present invention are beverages the alcohol content of which is calculated to be 0.0%, in particular, 0.00% by counting fractions of 5 and over as a unit and cutting away the rest. Exemplary types of the beer-taste beverages of the present invention include non-alcoholic beer-taste beverages, beer-taste soft drinks, and the like.

The "alcohol content" in the beer-taste beverage of the present invention refers to the content of alcohol (v/v %) in the beverage and can be measured by any known method, as by using a vibrating densimeter. Specifically, the beverage is filtered or sonicated to remove carbon dioxide; the $CO_2$-free sample is distilled under direct fire and the density at 15° C. of the resulting distillate is measured and converted to an alcohol content by looking at Table 2 which is titled "Conversion Between Alcohol Content and Density (15° C.) or Specific Gravity (15/15° C.)" and annexed to Analysis Methods Prescribed by the National Tax Agency (National Tax Agency Directive No. 6 in 2007, revised Jun. 22, 2007.) If the alcohol content is as low as less than 1.0%, a commercial apparatus for alcohol measurement or gas chromatography may be employed.

(Saccharides)

The term "saccharides" as used herein refers to ones based on the Nutrition Labelling Standards for Foods (Health, Labor and Welfare Ministry Notice No. 176 in 2003). Specifically, saccharides are that part of a food which remains after proteins, lipids, dietary fiber, ash, alcohols, and water have been removed. The amount of saccharides in a food can be calculated by subtracting the amounts of proteins, lipids, dietary fiber, ash, and water from the weight of the food. In this case, the amounts of proteins, lipids, dietary fiber, ash, and water are measured by the methods set out in the Nutrition Labelling Standards. Specifically, the amount of proteins is measured by the nitrogen determination and conversion method, the amount of lipids by the ether extraction method, the chloroform/methanol mixed liquid extraction method, the Gerber method, the acid decomposition method or the Roese-Gottlieb method, the amount of dietary fiber by high-performance liquid chromatography or the Prosky method, the amount of ash by the magnesium acetate addition ashing method, the direct ashing method or the sulfuric acid addition ashing method, and the amount of water by the Karl-Fischer method, the drying aid method, the method of drying by heating under reduced pressure, the method of drying by heating under atmospheric pressure, or the plastic film method.

The technology of the present invention is particularly useful in low-saccharide, beer-taste beverages which by nature involve difficulty in assuring good attributes of foam quality including foam stability. Hence, the amount of saccharides in the beer-taste beverage of the present invention is preferably not greater than 2.0 g/100 mL and its lower limit is preferably 0.04 g/100 mL, more preferably 0.2 g/100 mL. The amount of saccharides is more preferably from 0.25 to 2.0 g/100 mL inclusive, and even more preferably from 0.25 to 0.9 g/100 mL inclusive.

(Calorie)

The technology of the present invention is particularly useful in low-calorie, beer-taste beverages which involve difficulty in assuring good attributes of foam quality including foam stability. Hence, the calorie content in the beer-taste beverage of the present invention is preferably not greater than 8 kcal/100 mL, more preferably from 0.1 to 8 kcal/100 mL inclusive, even more preferably from 1 to 8 kcal/100 mL inclusive, and still more preferably from 1 to 5 kcal/100 mL inclusive.

The calorie content in beverages is calculated basically in accordance with "On Analysis Methods, etc. for Nutrients, etc. Listed in the Nutrition Labelling Standards" as published in association with the Health Promotion Act.

In principle, the determined amounts of the respective nutrients are multiplied by the associated energy conversion factors (4 kcal/g for proteins; 9 kcal/g for lipids; 4 kcal/g for saccharides; 2 kcal/g for dietary fiber; 7 kcal/g for alcohols; 3 kcal/g for organic acids) and the products are added up to give the total number of calories. For details, see "On Analysis Methods, etc. for Nutrients, etc. Listed in the Nutrition Labelling Standards."

Specific techniques for measuring the amounts of the respective nutrients contained in beverages may comply with the various methods of analysis described in "On Analysis Methods, etc. for Nutrients, etc. Listed in the Nutrition Labelling Standards" as a supplement to the Health Promotion Act. Alternatively, the Japan Food Research Laboratories (Foundation) will provide the necessary information about such calorific values and/or the amounts of the respective nutrients upon request.

(Hops)

The beer-taste beverages of the present invention may use hops as an ingredient. Since their scent and taste are generally similar to those of beer, hops are desirably used as an ingredient. If hops are to be used, ordinary pelletized hops, powdered hops, and hop extracts that are used in the manufacture of beer and like beverages can be used as selected appropriately for the desired scent and taste. Processed hops such as isomerized hops and reduced hops may also be used. These are all encompassed by the hops to be used in the present invention. The amount of hops to be added is not particularly limited and it is typically from 0.0001 to 1 wt % (inclusive) of the total quantity of the beverage.

(Other Ingredients)

In the present invention, other ingredients may optionally be used to such an extent that they will not be deleterious to the desired effects of the invention. Examples include sweeteners, acidulants, flavors, yeast extracts, colorants such as caramel colors, saponin-based substances extracted from plants such as soybean saponin and quillaja saponin, plant protein- and peptide-containing substances such as corn and soybean, proteinaceous substances such as bovine serum albumin, seasonings such as dietary fiber and amino acids, antioxidants such as ascorbic acid, and various acidulants, and these additives may optionally be used to such an extent that they will not be deleterious to the desired effects of the invention.

(Production of Beer-taste Beverages)

The beer-taste beverages of the present invention can be produced by ordinary methods known to skilled artisans. Briefly, mugi such as malt and, optionally, such ingredients as other cereal grains, starches, sugars, bitterness imparting agents or colorants are charged into a mashing kettle or tank where gelatinization and saccharification are performed, optionally in the presence of an added enzyme such as amylase; the saccharified mash is then filtered, boiled in the presence of optionally added hops, and transferred to a clarification tank to remove solids such as coagulated proteins. The saccharification, boiling and solids removal steps may be performed under known conditions.

To produce low-alcohol beverages, yeast is subsequently added for fermentation and then removed by a filter machine or other means. Fermentation may be performed under known conditions. If necessary, the alcohol concentration may be reduced by a known method such as membrane treatment or dilution. Alternatively, the fermentation step may be replaced by addition of an alcoholic ingredient such as spirits. Subsequently, storage, optional addition of carbon dioxide, filtration, packaging, and optional sterilization are performed to produce low-alcohol, beer-taste beverages.

In the case of non-alcoholic beverages, production is preferably done by a non-fermenting process that will not generate alcohol. For example, without performing the fermentation step but immediately following the above-described solids removal step, storage, addition of carbon dioxide, filtration, packaging, and optional sterilization steps are performed to produce unfermented, non-alcoholic, beer-taste beverages.

In this production process, it is important that the total amount of the mugi-derived extract component(s) in the beer-taste beverage obtained should lie from 0.1 to 2 wt % inclusive, preferably from 0.2 to 2 wt % inclusive, more preferably from 0.2 to 1.3 wt % inclusive, even more preferably from 0.25 to 1.3 wt % inclusive, still more preferably from 0.3 to 1.3 wt % inclusive, and yet more preferably from 0.35 to 1 wt % inclusive, and this amount may be adjusted at any of the production steps.

In this production process, the total amount of the malt-derived extract component(s) in the beer-taste beverage obtained may also be adjusted to lie from 0.1 to 2 wt % inclusive, preferably from 0.2 to 2 wt % inclusive, more preferably from 0.2 to 1.3 wt % inclusive, even more preferably from 0.25 to 1.3 wt % inclusive, still more preferably from 0.3 to 1.3 wt % inclusive, and yet more preferably from 0.35 to 1 wt % inclusive. This amount may be adjusted at any of the production steps.

(Foam Stabilizing Methods)

In the present invention, the foam that is formed on the liquid surface of beer-taste beverages is stabilized by adjusting the total amount of the mugi-derived extract component(s) in the beer-taste beverage to lie from 0.1 to 2 wt % inclusive, preferably from 0.2 to 2 wt % inclusive, more preferably from 0.2 to 1.3 wt % inclusive, even more preferably from 0.25 to 1.3 wt % inclusive, still more preferably from 0.3 to 1.3 wt % inclusive, and yet more preferably from 0.35 to 1 wt % inclusive.

Foam stabilization can also be accomplished by adjusting the total amount of the malt-derived extract component(s) in the beer-taste beverage to lie from 0.1 to 2 wt % inclusive, preferably from 0.2 to 2 wt % inclusive, more preferably from 0.2 to 1.3 wt % inclusive, even more preferably from 0.25 to 1.3 wt % inclusive, still more preferably from 0.3 to 1.3 wt % inclusive, and yet more preferably from 0.35 to 1 wt % inclusive.

Here, the foam stabilization can be evaluated by measuring such attributes as cling and foam stability. "Cling" means the ability by which foam that results from pouring a beverage into a container adheres to its sides. Cling is considered to be a property that contributes to a phenomenon also called "angel ring."

"Foam stability" means the life of foam and can be evaluated by a known method such as the micro-Rudin method. This can also be evaluated by another known method such as the NIBEM method (J. Inst. Brewing, 2003, 109(4), 400-402.) The beverage to be evaluated is poured into a container and when a specified time lapses, the amount and other features of the foam that remains adhering to the sides of the container are measured, whereby overall evaluation of the foam stability can be achieved, including the cling which cannot be measured by the NIBEM method (Packaged Beverages)

The beer-taste beverage of the present invention may be packaged in containers. The types of containers are in no way limited and bottles, cans, kegs, PET bottles and the like may be filled with the beverage and sealed to produce packaged beverages.

EXAMPLES

On the following pages, the present invention is described by means of examples, to which the invention is in no way limited.

<Method of Evaluating Foam Stability>

In the Examples, foam stability was evaluated by the following method.

This method includes pouring a specified amount of effervescent beverage (sample) into a specified measuring cylinder within a specified time and measuring the amount of foam that remains adhering to the sides of the measuring cylinder after the lapse of a specified time (this amount may be called "the foam adhering area"), whereby the stability of the foam is evaluated quantitatively. The sample and the device that would contact it (i.e., the measuring cylinder and the funnel through which the sample was to be poured) were preliminarily held at 20° C. and measurement was conducted within a thermostatic chamber set at 20° C. The funnel was fitted on the measuring cylinder (2 L) and the entire sample (whose volume was equal to the capacity of a 633-mL bottle) was poured down the sides of the funnel into the measuring cylinder at a uniform rate (taking about 20 seconds to fill the same.) Upon completion of the pouring, the funnel was detached from the measuring cylinder, which was then allowed to stand. Twenty-nine minutes after the onset of the pouring of the sample, a flashbulb was set within the measuring cylinder (at a position about 200 mL above the boundary between the liquid surface and the foam) and, subsequently, with photosensitive paper being wrapped around the measuring cylinder to cover the area where the foam adhered, a picture was taken exactly 30 minutes after the start of sample injection. After developing the photosensitive paper, the borderline between the liquid surface and the foam on the developed image was marked off and the photographed areas where the foam remained were delineated. Large foam masses were directly delineated. The smaller masses which were less than 1 cm on the longer axis were disregarded. The delineated foam adhering areas were measured with an area meter and calculated as cling levels (T-SHV values). Note that pictures of adhering foam may be taken with a CCD camera whereas the areas of foamy portions may be measured by processing with an image analyzer. It may be concluded that the larger the foam adhering areas that are measured, the higher the foam stability is. From the observations so far obtained with beers, it may safely be said that foam stability is satisfactory if the T-SHV value is 150 $cm^2$ and above but undoubtedly insufficient if it is less than 100 $cm^2$. Hence, in the Examples, the rating was X when the T-SHV value was less than 100 $cm^2$, Δ when it was 100 $cm^2$ and above but less than 150 $cm^2$, and ○ when it was 150 $cm^2$ and above.

<Evaluation of Chromaticity>

In the Examples, the chromaticity of beverage samples was evaluated by the following method. To be more specific, measurement was conducted in accordance with the BCOJ Beer Analysis Methods, 8.8 Chromaticity, 8.8.2 Spectroscopy. A degassed sample was placed in a 10 mm cell and the absorbance as measured with monochromatic light of 430 nm was multiplied by a factor to determine the EBC chromaticity of the sample.

<Evaluation of Bitterness Unit>

In the Examples, the bitterness unit of beverage samples was evaluated by the following method. To be more specific, measurement was conducted in accordance with the BCOJ Beer Analysis Methods, 8.15 Bitterness Unit. A mixture of a degassed sample with an added acid was extracted with isooctane and the absorbance of the resulting isooctane layer was measured at 275 nm with pure isooctane being used as a control; the measured absorbance was multiplied by a factor to determine the bitterness unit (BU) of the sample.

<Evaluation of Extract Components>

In the Examples, the amounts of extract components in beverage samples were evaluated by the following method. To be more specific, measurement was conducted in accordance with the BCOJ Beer Analysis Methods, 7.2 Extracts. The specific gravity of a sample at 20° C. was measured with a vibrating densitometer and the corresponding amount of extract components was determined by referring to the annexed Table for Extracts. Among the thus determined extract components, those derived from mugi (or malt) were determined for their amounts by subtracting the amounts, as separately determined, of additives and extract components derived from other ingredients, from the amounts of all extract components.

<Evaluation of Calorie>

Calorie was calculated in accordance with "On Analysis Methods, etc. for Nutrients, etc. Listed in the Nutrition Labelling Standards" as published in association with the Health Promotion Act.

<Evaluation of Saccharides>

For measurement of saccharides, the calculation formula specified in the Nutrition Labelling Standards (Health, Labor and Welfare Ministry Notice No. 176 in 2003) was used.

<Evaluation of Scent and Taste>

In this specification, the scent and taste of beer-taste beverages was evaluated by a sensory test based on the scoring method. Six expert panelists were asked to make evaluation for the presence or absence of a beer-like scent or taste on a rating system with point 4 being the full score. On the rating system in which "sensed" was given point 4, "somewhat sensed" point 3, "slightly sensed" point 2, and "not sensed" point 1, the scores were averaged and the result of evaluation was assigned to one of the following three levels depending on the average value.

Average ranging from 1.0 to less than 2.0 X;

Average ranging from 2.0 to less than 3.0 Δ;

Average ranging from 3.0 to no more than 4.0 ○.

Example 1

<Production of Non-alcoholic Beer-taste Beverage>

Sample Nos. 1-7 of the beer-taste beverage of the present invention whose total amount of mugi-derived extract components was within the desired range, as well as Comparative Sample Nos. 1-3 of beer-taste beverage whose total amount of mugi-derived extract components was outside the desired range were produced by the following method. To produce Sample Nos. 1-4, malt was used in 20 kg (60 wt % of which consisted of dark colored malt, or caramel malt), and to produce Sample Nos. 5-7 and Comparative Sample Nos. 1-3, malt was used in 20 kg (50 wt % of which consisted of dark colored malt, or caramel malt).

The malt was ground to an appropriate grain size, charged into a mashing vessel, and mixed with 120 L of warm water to prepare mash with about 50° C. After holding at 50° C. for 30 minutes, the temperature was slowly raised and saccharification was performed at 65-72° C. for 60 minutes. Upon completion of saccharification, the mash was heated to 77° C. and transferred to a wort filtration vessel, where it was filtered to form a filtrate.

A portion of the filtrate was mixed with warm water at a ratio that was so adjusted that upon completion of boiling, the amount of the extract components would reach the desired level. At a production scale of 100 L, about 100 g of hops were added and the mixture was boiled at 100° C. for 80 minutes. Lees were separated from the boiled mixture, which was then cooled to about 2° C.; thereafter, antioxidants, flavors, acidulants (sufficient to lower pH to less than 4), sweeteners and optionally a caramel color were added in suitable amounts, and the mixture was stored for about 24 hours. In the process, a suitable amount of carbon dioxide was added. Subsequent steps of filtration, bottling and sterilization (heating for 10 minutes at 65° C. and above) yielded Sample Nos. 1-7 of the beer-taste beverage of the present invention. Among these samples, Nos. 3 and 4 were different batches prepared by the same method, and so were Nos. 5 and 6. Similarly, the three Comparative Samples were different batches prepared by the same method.

<Quality Evaluation>

The quality of Sample Nos. 1-7 and Comparative Sample Nos. 1-3 was evaluated and the results are shown in Table 1 below.

TABLE 1

|  | Sample 1 | Sample 2 | Sample 3 | Sample 4 | Sample 5 |
| --- | --- | --- | --- | --- | --- |
| Total extract component (wt %) | 0.2% | 0.3% | 0.4% | 0.4% | 1.1% |
| Malt-derived extract component (wt %) | 0.10% | 0.20% | 0.30% | 0.30% | 1% |
| Total mugi-derived extract component (wt %) | 0.10% | 0.20% | 0.30% | 0.30% | 1% |
| Alcohol (v/v %) | 0.00 | 0.00 | 0.00 | 0.00 | 0.00 |
| Chromaticity (EBC) | 7 | 7 | 8 | 10 | 7 |
| Bitterness unit (BU) | 20 | 20 | 18 | 18 | 18 |
| Calorie (kcal/100 mL) | 0.7 | 1.2 | 1.6 | 1.6 | 4 |
| Saccharides (g/100 mL) | 0.2 | 0.3 | 0.4 | 0.4 | 1.0 |
| T-SHV (cm2) | 119 | 178 | 318 | 283 | 201 |
| Foam stability | Δ | ○ | ○ | ○ | ○ |
| Scent/taste | Δ | ○ | ○ | ○ | ○ |

|  | Sample 6 | Sample 7 | Comparative Sample 1 | Comparative Sample 2 | Comparative Sample 3 |
| --- | --- | --- | --- | --- | --- |
| Total extract component (wt %) | 1.1% | 2.1% | 4.1% | 4.1% | 4.1% |
| Malt-derived extract component (wt %) | 1% | 2% | 4% | 4% | 4% |
| Total mugi-derived extract component (wt %) | 1% | 2% | 4% | 4% | 4% |
| Alcohol (v/v %) | 0.00 | 0.00 | 0.00 | 0.00 | 0.00 |
| Chromaticity (EBC) | 8 | 10 | 8 | 9 | 8 |
| Bitterness unit (BU) | 18 | 20 | 18 | 18 | 16 |
| Calorie (kcal/100 mL) | 4 | 8 | 16 | 16 | 16 |
| Saccharides (g/100 mL) | 1.0 | 2.0 | 4.0 | 4.0 | 4.0 |
| T-SHV (cm2) | 168 | 251 | 47 | 35 | 35 |
| Foam stability | ○ | ○ | X | X | X |
| Scent/taste | ○ | ○ | ○ | ○ | ○ |

As is clear from Table 1, the value of T-SHV serving as an index of foam stability was significantly high when the amount of mugi- or malt-derived extract components was low (Sample Nos. 1-7). Among these, Sample No. 1 having the smallest amount of such extract components was somewhat lower in foam stability. When each of Sample Nos. 1-7 and Comparative Sample Nos. 1-3 was poured into a container and evaluated by eyes for the quality of foam they produced, the results were generally the same as those shown in Table 1 with respect to foam stability.

Each of Sample Nos. 2-7 and Comparative Sample Nos. 1-3 had a satisfactory taste. On the other hand, Sample No. 1 having the smallest amount of mugi- or malt-derived extract components was somewhat unsatisfactory from the viewpoint of beer-like scent and taste.

Example 2

Production (of Non-alcoholic Beer-taste Beverage)

Using malt (20 wt % of which consisted of caramel malt), the procedure of Example 1 was repeated to produce a sample of the beer-taste beverage of the present invention whose amount of malt-derived extract components was 1.3 wt % (whose total amount of mugi-derived extract components was also 1.3 wt %). The total amount of all extract components in this sample including those derived from ingredients other than mugi was 1.4 wt %. The sample had an alcohol content of 0.00%, with the calorie content being 5 kcal/100 mL and the amount of saccharides being 1.3 g/100 mL. The sample also excelled in taste and foam quality including the attribute of foam stability, and it was as satisfactory as Sample Nos. 2-7.

Example 3

Production (of Non-alcoholic Beer-taste Beverage)

Using malt (60 wt % of which consisted of caramel malt), the procedure of Example 1 was repeated to produce a sample of the beer-taste beverage of the present invention whose amount of malt-derived extract components was 0.35 wt % (whose total amount of mugi-derived extract components was also 0.35 wt %). The total amount of all extract components in this sample including those derived from ingredients other than mugi was 0.45 wt %. The sample had an alcohol content of 0.00%, with the calorie content being 2 kcal/100 mL and the amount of saccharides being 0.4 g/100 mL. The sample also excelled in taste and foam quality including the attribute of foam stability, and it was as satisfactory as Sample Nos. 2-7.

Example 4

Production (of Non-alcoholic Beer-taste Beverage)

Using malt (80 wt % of which consisted of caramel malt), the procedure of Example 1 was repeated to produce a sample of the beer-taste beverage of the present invention whose amount of malt-derived extract components was 0.25 wt % (whose total amount of mugi-derived extract components was also 0.25 wt %). The total amount of all extract components in this sample including those derived from ingredients other than mugi was 0.35 wt %. The sample had an alcohol content of 0.00%, with the calorie content being 1.4 kcal/100 mL and the amount of saccharides being 0.3 g/100 mL. The sample also excelled in taste and foam quality including the attribute of foam stability, and it was as satisfactory as Sample Nos. 2-7.

Example 5

Production (of Non-alcoholic Beer-taste Beverage)

A sample of the beer-taste beverage of the present invention was produced using decomposed barley instead of malt. To be more specific, at a production scale of 100 L, warm water was added to 130 g of the decomposed barley at a mixing ratio that was so adjusted that upon completion of the boiling step, the amount of the extract components would reach about 1.0%; further, about 100 g of hops were added and the mixture was boiled at 100° C. for 80 minutes. Lees were separated from the boiled mixture, which was then cooled to about 2° C.; thereafter, antioxidants, flavors, acidulants (sufficient to lower pH to less than 4), sweeteners, and a caramel color were added in suitable amounts, and the mixture was stored for about 24 hours. In the process, a suitable amount of carbon dioxide was added. Subsequent steps of filtration, bottling and sterilization (heating for 10 minutes at 65° C. and above) yielded a sample of the beer-taste beverage of the present invention. This sample had an alcohol content of 0.00%, with the energy content being 4 kcal/100 mL and the amount of saccharides being 1.0 g/100 mL. The amount of mugi-derived extract components in this sample was 1.0 wt % and the total amount of all extract components including those derived from ingredients other than mugi was 1.1 wt %. The sample also excelled in taste and foam quality including the attribute of foam stability, and it was as satisfactory as Sample Nos. 2-7.

Example 6

<Production of Low-alcohol Beer-taste Beverage>

Using malt (50 wt % of which consisted of caramel malt), the procedure of Example 1 (with adjustment in the amount of the saccharified filtrate to be used) was repeated to produce additional samples of beer-taste beverage, in which the amount of malt-derived extract components was 0.1, 0.2, 0.3, 1.0, 2.0 and 3.9 wt % (the total amount of mugi-derived extract components was also 0.1, 0.2, 0.3, 1.0, 2.0 and 3.9 wt %). To these samples, an aqueous solution of ethanol was added to produce Sample Nos. 8-12 (the total amount being 0.1, 0.2, 0.3, 1.0, and 2.0 wt %, respectively, for each of the malt- and mugi-derived extract components) and Comparative Sample No. 4 (the total amount being 3.9 wt % for each of the malt- and mugi-derived extract components), such that their ethanol contents would be each 0.95 v/v %, the alcohol content in each of these samples being less than 1 v/v %.

<Quality Evaluation>

The quality of Sample Nos. 8-12 and Comparative Sample No. 4 was evaluated and the results are shown in Table 2 below.

TABLE 2

|  | Sample 8 | Sample 9 | Sample 10 | Sample 11 | Sample 12 | Comparative Sample 4 |
|---|---|---|---|---|---|---|
| Total extract component (wt %) | 0.20 | 0.30 | 0.4 | 1.1 | 2.1 | 4.0 |
| Malt-derived extract component (wt %) | 0.10 | 0.20 | 0.3 | 1.0 | 2.0 | 3.9 |
| Total mugi-derived extract component (wt %) | 0.10 | 0.20 | 0.3 | 1.0 | 2.0 | 3.9 |
| Alcohol (v/v %) | 0.95 | 0.95 | 0.95 | 0.95 | 0.95 | 0.95 |
| Chromaticity (EBC) | 7 | 7 | 7 | 7 | 7 | 7 |
| Bitterness unit (BU) | 18 | 18 | 18 | 18 | 18 | 18 |
| Calorie (kcal/100 mL) | 6.1 | 6.5 | 6.9 | 9.6 | 13.5 | 21.3 |
| Saccharides (g/100 mL) | 0.1 | 0.2 | 0.3 | 1.0 | 2.0 | 3.9 |
| T-SHV (cm2) | 102 | 161 | 256 | 167 | 227 | 55.2 |
| Foam stability | Δ | ○ | ○ | ○ | ○ | X |
| Scent/taste | Δ | ○ | ○ | ○ | ○ | ○ |

As is clear from Table 2, the value of T-SHV serving as an index of foam stability was significantly high when the amount of mugi- or malt-derived extract components was low (Sample Nos. 8-12). Among these, Sample No. 8 having the smallest amount of such extract components was somewhat lower in foam stability. When each of Sample Nos. 8-12 and Comparative Sample No. 4 was poured into a container and evaluated by eyes for the quality of foam they produced, the results were generally the same as those shown in Table 2 with respect to foam stability.

Each of Sample Nos. 9-12 and Comparative Sample No. 4 had a satisfactory taste. On the other hand, Sample No. 8 having the smallest amount of mugi- and malt-derived extract components was somewhat unsatisfactory from the viewpoint of beer-like scent and taste.

Example 7

Production (of Low-alcohol Beer-taste Beverage)

Malt, as ground to an appropriate grain size, was charged into a mashing vessel and mixed with 120 L of warm water to prepare mash with about 50° C. After holding at 50° C. for 30 minutes, the temperature was slowly raised and saccharification was performed at 65-72° C. for 60 minutes. Upon completion of saccharification, the mash was heated to 77° C. and transferred to a wort filtration vessel, where it was filtered to form a filtrate. A portion of the filtrate was mixed with warm water at a ratio that was so adjusted that upon completion of boiling, the amount of the extract components would reach 2.0 wt % (the total amount of the mugi-derived extract components would also be 2.0 wt %). At a production scale of 100 L, about 100 g of hops (including a hop extract) were added to the mixture, which was boiled at 100° C. for 80 minutes. Lees were separated from the boiled mixture, which was then cooled to about 15° C. and subjected to fermentation in the presence of a brewer's yeast added in an appropriate amount; about 24 hours later, the mixture was quenched to 0° C. to arrest the fermentation. To the resulting mixture, antioxidants, flavors, acidulants (sufficient to lower pH to less than 4), sweeteners, and a caramel color were added in suitable amounts, and subsequent steps of filtration, bottling and sterilization (heating for 10 minutes at 65° C. and above) yielded another sample of the low-alcohol, beer-taste beverage of the present invention. This sample had an alcohol content of about 0.30%, with the energy content being 7.5 kcal/100 mL and the amount of saccharides being 1.5 g/100 mL. The amount of the malt-derived extract components in the sample had been reduced to about 1.5 wt % on account of assimilation by the yeast during fermentation (the total amount of the mugi-derived extract components was also 1.5 wt %). The sample also excelled in scent/taste and foam quality including the attribute of foam stability, and it was as satisfactory as Sample Nos. 2-7.

The invention claimed is:

1. A beer-taste beverage in which the total amount of a mugi-derived extract component(s) is from 0.1 to 2 wt % inclusive, wherein the total, amount of all extract components including ones derived from ingredients other than mugi is from 0.2 to 2.1 wt % inclusive, wherein the beverage has a calorie content from 0.1 to 8 kcal/100 ml inclusive and wherein the alcohol content is no more than 1.0%.

2. The beer-taste beverage as recited in claim 1, wherein the total amount of a malt-derived extract component(s) is from 0.1 to 2 wt % inclusive, wherein the malt is a product obtained by germinating the seeds of mugi, drying the sprouts, and removing the roots.

3. The beer-taste beverage as recited in claim 1, wherein the beverage has an amount of saccharides from 0.2 to 2.0 g/100 mL, inclusive.

4. The beer-taste beverage as recited in claim 2, wherein the beverage has an amount of saccharides from 0.2 to 2.0 g/100 mL inclusive.

5. The beer-taste beverage as recited in claim 1, which is free of alcohol.

6. The beer-taste beverage as recited in claim 2, which is free of alcohol.

7. The beer-taste beverage as recited in claim 3, which is free of alcohol.

* * * * *